United States Patent [19]

Delaney

[11] Patent Number: 5,076,531
[45] Date of Patent: Dec. 31, 1991

[54] UTILITY LOCKING DEVICE

[76] Inventor: Edward W. Delaney, 129 Reads Ave., Blackpool, Lancashire, England, FYI 4JH

[21] Appl. No.: 744,426

[22] Filed: Aug. 13, 1991

[51] Int. Cl.⁵ .............................................. F16M 13/00
[52] U.S. Cl. ....................................... 248/552; 70/58; 211/4
[58] Field of Search ........................ 248/551, 552, 553; 224/42-45 R; 211/4, 8, 9; 70/74, 75, 76, 58

[56] References Cited

U.S. PATENT DOCUMENTS

| | | | |
|---|---|---|---|
| 2,765,646 | 10/1956 | Hepler | 211/4 X |
| 3,831,892 | 8/1974 | Herman | 211/4 |
| 3,877,624 | 4/1975 | Carson | 224/42.45 R X |
| 4,248,399 | 2/1981 | Gipson | 224/42.45 R X |
| 4,249,685 | 2/1981 | Sawby | 70/58 X |
| 4,413,801 | 11/1983 | Lancaster | 224/42.45 R X |
| 4,524,872 | 6/1985 | Chamberlain | 211/4 |
| 4,756,504 | 7/1988 | Chamberlain | 211/4 X |
| 4,923,103 | 5/1990 | Sauber | 224/42.45 R |

FOREIGN PATENT DOCUMENTS 1173603 12/1969 United Kingdom ................ 248/552

Primary Examiner—J. Franklin Foss
Attorney, Agent, or Firm—David L. Baker

[57] ABSTRACT

A combination of utility locking devices, for securing and supporting items having a frame-like structure such as ladders between the two brackets, has a first articulated bracket and a second articulated bracket. The first bracket has a base plate and a support arm hingedly connected to the base plate at a first end of the arm. There is a retaining head on a second end of the arm. The first braket is usually placed on a surface and aligned with the second bracket at a point distant the first bracket. The second bracket has several hingedly connected leaves. The second bracket has bracing members to strengthen the bracket in the secured position. The first and second bracket may be placed in a stowed position for convenience.

2 Claims, 2 Drawing Sheets

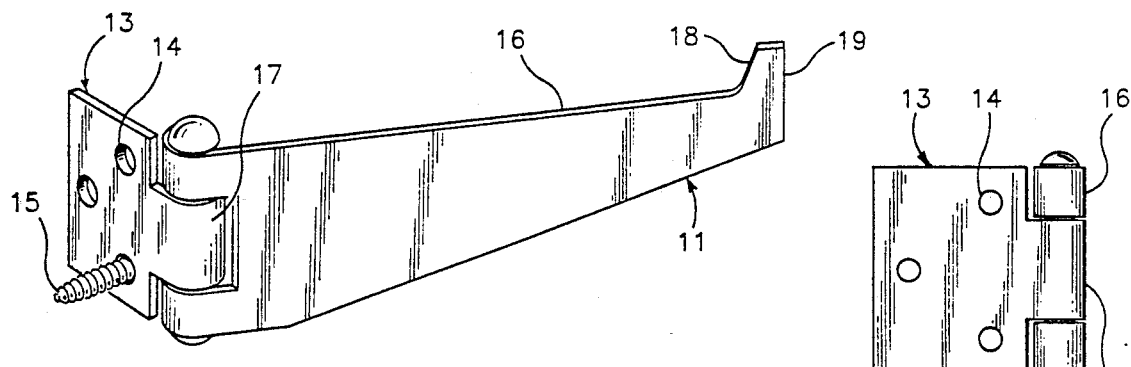
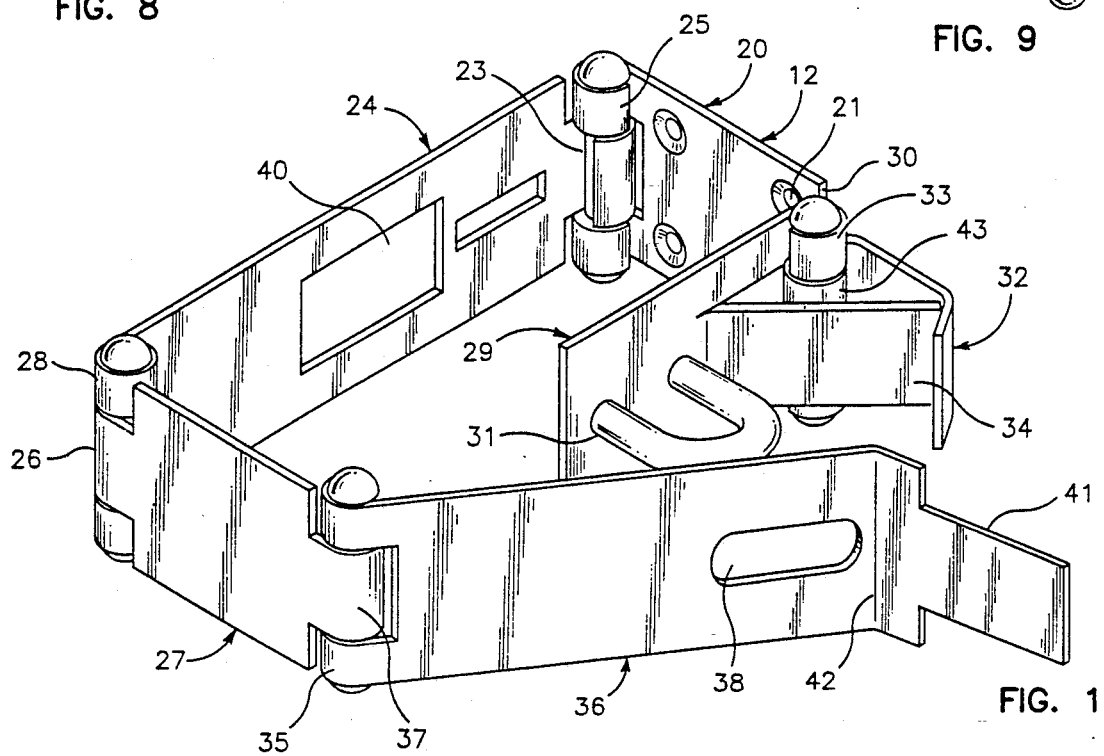
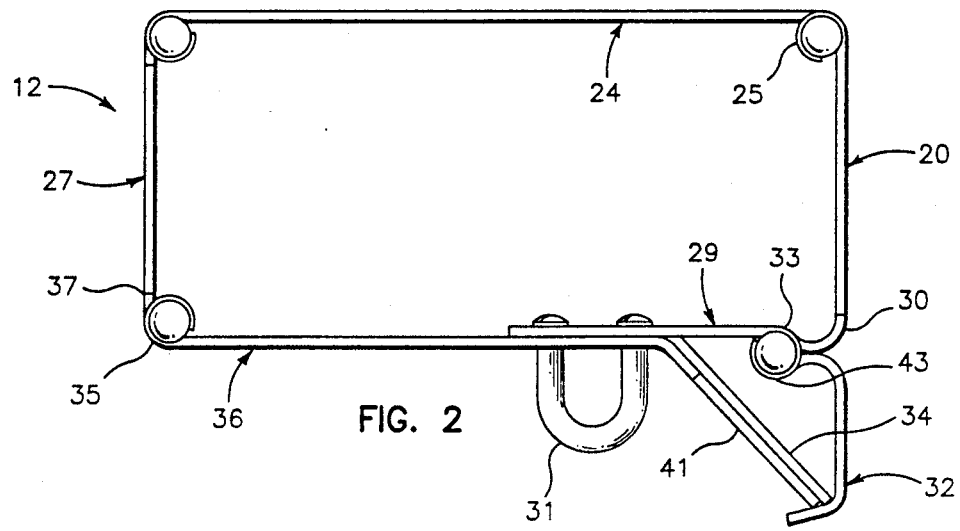

UTILITY LOCKING DEVICE

BACKGROUND OF THE INVENTION

1. Field of the Invention

This invention relates to a locking and support device that the user may use to support and secure a ladder or other items having a frame or similar member.

2. Description of the Related Art

Several devices have been offered to the public to support items and provide a means to lock those items to the support. But none have the ability to be placed in a convenient and easy stowed position and provide a sturdy support and strong secured position for locking and supporting an item such as a ladder to a surface such as a truck, trailer or wall of a building. The present device provides many features that discourage a would be thief from obtaining the item protected by the Utility Locking Device.

D. M. Herman U.S. Pat. No. 3,831,892 on Aug. 27, 1974 shows a Jack Lock having a two bracket combination to mount and lock a particular type of car jack within a car trunk. It is designed only for that purpose.

L. W. Chamberlain U.S. Pat. No. 4,524,872 on June 25, 1985 describes a Universal Locking Device having an adjustable locking mechanism which supports and secures an object having a frame-like structure. It has a removable locking bar whose position may be adjusted on the bar to accommodate several sizes of items to be secured to the device.

L. W. Chamberlain U.S. Pat. No. 4,756,504 on July 12, 1988 shows a Utility Locking Device similar to U.S. Pat. No. 4,524,872. It has a support bar and a retaining plate. The support bar is hook-shaped and the retaining plate is secured to the bar and acts to lock the item to be protected to the bar.

SUMMARY OF THE INVENTION

A combination of utility locking devices, for securing and supporting items having a frame-like structure such as ladders between the two brackets, has a first articulated bracket and a second articulated bracket.

The first bracket has a base plate and a support arm hingedly connected to the base plate at a first end of the arm. There is a retaining head on a second end of the arm. The first bracket is usually placed on a surface and aligned with the second bracket at a point distant the first bracket.

The second bracket has a base leaf. There is a first end of a receiving leaf hingedly connected to a first end of the base leaf. A first end of a linking leaf is hingedly connected to a second end of the receiving leaf. There may be more than two linking leaves. A hasp leaf is hingedly connected to a second end of the base leaf.

There is a hasp attached to the hasp leaf. One end of a brace leaf is hingedly connected to one end of the hasp leaf and to the second end of the base leaf. There is a brace member to brace the hasp leaf against the brace leaf when the hasp is in a secured position. The brace member is attached to the hasp leaf.

The first and second bracket have a stowed position and a secured position. The first bracket is in the stowed position when the support arm is swung back on its hinge against the surface to which the base plate is attached. The first bracket is in the secured position when the support arm is substantially perpendicular to the surface to which the base plate is attached. In the stowing of the second bracket (shown in FIG. 3), the hasp leaf is folded against the base leaf. Then the receiving leaf is placed against the hasp leaf. The hasp passes through the hasp port and the brace member passes through the brace member port in this position. Then the linking leaf and the securing leaf can be placed more or less parallel to the surface to which the base leaf is attached.

A first end of a securing leaf is hingedly connected to a second end of the linking leaf. There is a first hasp port in the securing leaf to receive the hasp when the hasp is in the secured position. A second hasp port is in the receiving leaf to receive the hasp when the hasp leaf is in a stowed position. There is a brace member port on the receiving leaf to receive the brace member when the hasp leaf is in the stowed position. A brace head, on a second end of the securing leaf, braces the securing leaf against the brace leaf when the securing leaf is in the secured position.

There may be a plurality of first mounting ports in the base plate to receive a plurality of first fasteners to mount the base plate to a surface. There may be a plurality of second mounting ports in the base leaf of the second bracket to receive a plurality of second fasteners to mount the first leaf to a surface.

It is an object of this invention to provide Utility Locking Device to releasingly secure and support items such as ladders and other frame-like devices on a surface to reduce unauthorized removal of the items.

It is another object of this invention to provide a Utility Locking Device that will fold into a stowed position for convenience and storage when the device is not being used to hold the item to be secured and supported.

BRIEF DESCRIPTION OF THE DRAWINGS

FIG. 1 is a perspective view of a second bracket of a Utility Locking Device.

FIG. 2 is a top view of the second bracket of the Utility Locking Device.

FIG. 8 is a front view of the first bracket of the Utility Locking device.

FIG. 9 is a front view of the base plate of the first bracket.

DESCRIPTION OF THE PREFERRED EMBODIMENT

Figure 4:
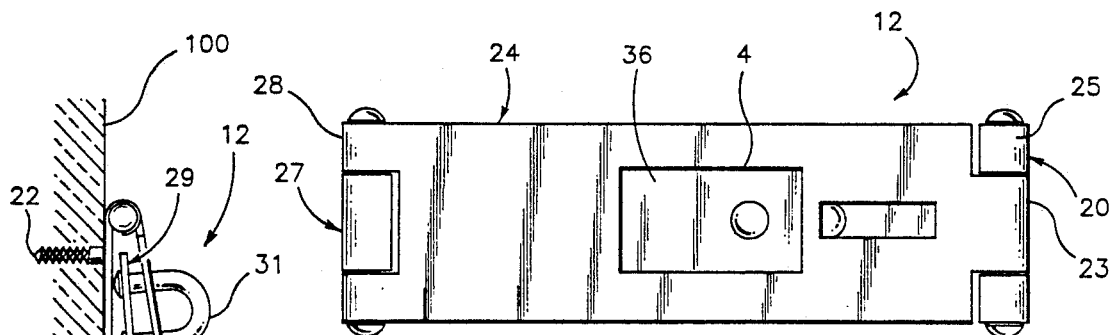
FIG. 4 is a rear view of the receiving leaf with the second bracket in the secured position.

A combination of utility locking devices 10 having a first articulated bracket 11 and a second articulated bracket 12 is described herein.

The first bracket 11 has a base plate 13 and a plurality of first mounting ports 14 in the base plate 13 to receive a plurality of first fasteners 15 to mount the base plate 13 to a surface 100. Surface 100 may be a wall of a building or the wall of a vehicle or trailer or similar objects.

There is a support arm 16 hingedly connected to the base plate 13 at a first end 17 of the arm 16. There is a retaining head 18 on a second end 19 of the arm 16 to reduce slippage of the item (not shown) supported off the first bracket.

The second bracket 12 of the combination of Utility Locking Devices 10 has a base leaf 20. There are a plurality of second mounting ports 21 in the base leaf 20 to receive a plurality of second fasteners 22 to mount the second bracket 12, by way of the base leaf 20, to the surface 100. A first end 23 of a receiving leaf 24 is hingedly connected to a first end 25 of the base leaf 20. A first end 26 of a linking leaf 27 is hingedly connected to a second end 28 of the receiving leaf 24.

A hasp leaf 29 is hingedly connected to a second end 30 of the base leaf 20 and there is a hasp 31 attached to the hasp leaf 29. One end 43 of a brace leaf 32 is hingedly connected to one end 33 of the hasp leaf 29 and to the second end 30 of the base leaf 20. There is a brace member 34, to brace the hasp leaf 29 against the brace leaf 32 when the hasp 31 is in a secured position (as shown in FIG. 2), attached to the hasp leaf 29.

Figure 5:
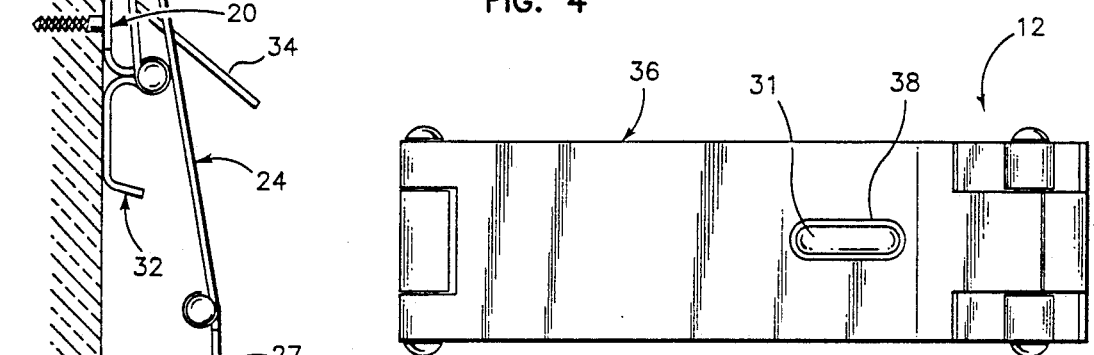
FIG. 5 is a front view of the securing leaf with the second bracket in the secured position.
Figure 3:
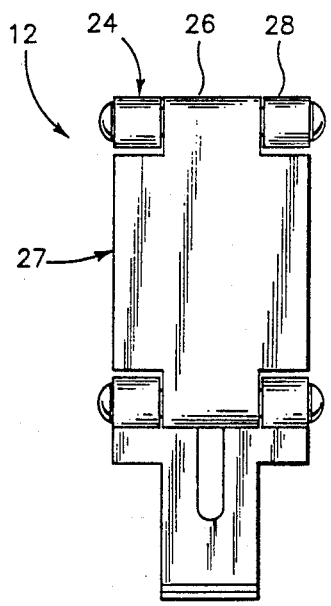
FIG. 3 is a side view of the second bracket of the Utility Locking Device shown attached to a mounting surface and in a stowed position.
Figures 6, 7:
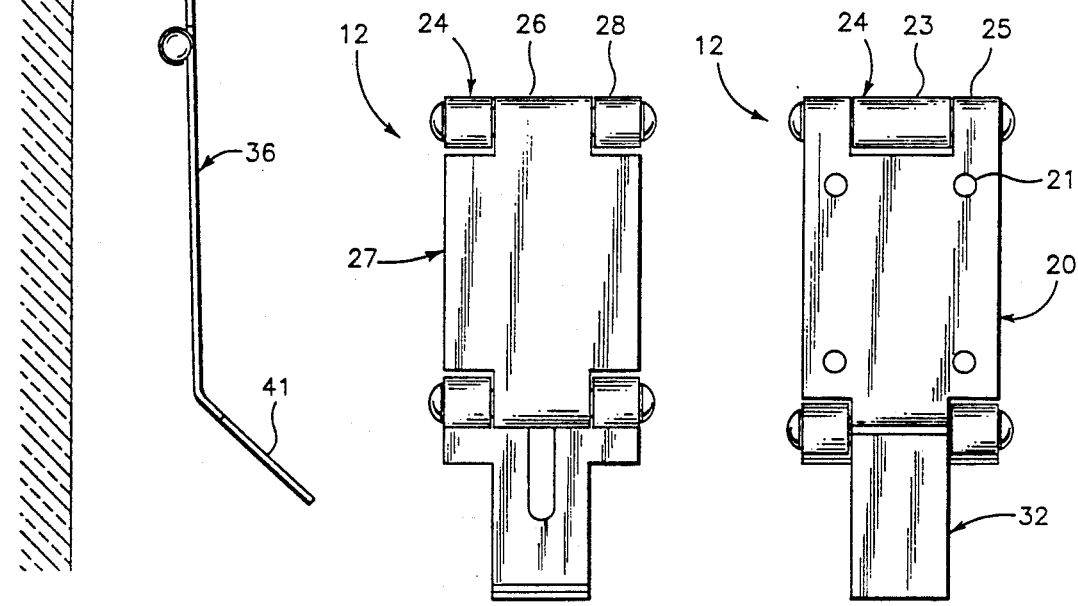
FIG. 6 is a rear view of the linking leaf on the Utility Locking Device with the second bracket in the secured position.
FIG. 7 is a rear view of the base leaf on the Utility Locking Device with the second bracket in the secured position.

A first end 35 of a securing leaf 36 is hingedly connected to a second end 37 of the linking leaf 27. There is a first hasp port 38 in the securing leaf 36 to receive the hasp 31 when the hasp 31 is in the secured position as shown in FIGS. 2 and 5. There is a second hasp port 39 in the receiving leaf 24 to receive the hasp 31 when the hasp leaf 29 is in a stowed position as shown in FIG. 3. There is a brace member port 40 on the receiving leaf 24 to receive the brace member 34 when the hasp leaf 29 is in the stowed position. There is a brace head 41 on a second end 42 of the securing leaf 36 to brace the securing leaf 36 against the brace leaf 32 when the securing leaf 36 is in the secured position.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A combination of utility locking devices comprising:
   a. a first articulated bracket;
   b. a second articulated bracket;
   c. the first bracket comprising:
      a base plate;
      a support arm hingedly connected to the base plate at a first end of the arm; and
      a retaining head on a second end of the arm;
   d. the second bracket comprising:
      a base leaf;
      a first end of a receiving leaf hingedly connected to a first end of the base leaf;
      a first end of a linking leaf hingedly connected to a second end of the receiving leaf;
      a hasp leaf hingedly connected to a second end of the base leaf;
      a hasp attached to the hasp leaf;
      one end of a brace leaf hingedly connected to one end of the hasp leaf and to the second end of the base leaf;
      a brace member, to brace the hasp leaf against the brace leaf when the hasp is in a secured position, attached to the hasp leaf;
      a first end of a securing leaf hingedly connected to a second end of the linking leaf;
      a first hasp port in the securing leaf to receive the hasp when the hasp is in the secured position;
      a second hasp port in the receiving leaf to receive the hasp when the hasp leaf is in a stowed position;
      a brace member port on the receiving leaf to receive the brace member when the hasp leaf is in the stowed position; and
      a brace head on a second end of the securing leaf to brace the securing leaf against the brace leaf when the securing leaf is in the secured position.

2. A combination of utility locking devices comprising:
   a. a first articulated bracket;
   b. a second articulated bracket;
   c. the first bracket comprising:
      a base plate;
      a plurality of first mounting ports in the base to receive a plurality of mounting first fasteners to mount the plate to a surface;
      a support arm hingedly connected to the base plate at a first end of the arm; and
      a retaining head on a second end of the arm; and
   d. the second bracket comprising:
      a base leaf;
      a plurality of second mounting ports in the base leaf to receive a plurality of second fasteners to mount the base leaf to a surface;
      a first end of a receiving leaf hingedly connected to a first end of the base leaf;
      a first end of a linking leaf hingedly connected to a second end of the receiving leaf;
      a hasp leaf hingedly connected to a second end of the base leaf;
      a hasp attached to the hasp leaf;
      one end of a brace leaf hingedly connected to one end of the hasp leaf and to the second end of the base leaf;
      a brace member, to brace the hasp leaf against the brace leaf when the hasp is in a secured position, attached to the hasp leaf;
      a first end of a securing leaf hingedly connected to a second end of the linking leaf;
      a first hasp port in the securing leaf to receive the hasp when the hasp is in the secured position;
      a second hasp port in the receiving leaf to receive the hasp when the hasp leaf is in a stowed position;
      a brace member port on the receiving leaf to receive the brace member when the hasp leaf is in the stowed position; and
      a brace head on a second end of the securing leaf to brace the securing leaf against the brace leaf when the securing leaf is in the secured position.

* * * * *